(12) United States Patent
Trexler et al.

(10) Patent No.: US 8,584,732 B1
(45) Date of Patent: Nov. 19, 2013

(54) MOLD RELEASE METHOD FOR A COLD SPRAY PROCESS

(71) Applicants: Matthew D. Trexler, Baltimore, MD (US); Victor K. Champagne, Dudley, MA (US)

(72) Inventors: Matthew D. Trexler, Baltimore, MD (US); Victor K. Champagne, Dudley, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/624,984

(22) Filed: Sep. 24, 2012

(51) Int. Cl.
*B22D 23/00* (2006.01)

(52) U.S. Cl.
USPC ................ 164/46; 164/72; 164/131

(58) Field of Classification Search
USPC .......... 164/14, 35, 46, 72, 131; 427/133–135; 106/38.2–38.9
See application file for complete search history.

(56) References Cited

U.S. PATENT DOCUMENTS

| | | | |
|---|---|---|---|
| 6,938,668 B2 * | 9/2005 | Whicher et al. | 164/46 |
| 2006/0118263 A1 * | 6/2006 | Silvestrini | 164/46 |
| 2010/0143700 A1 * | 6/2010 | Champagne et al. | 428/323 |
| 2011/0129379 A1 | 6/2011 | Zanon et al. | |

* cited by examiner

*Primary Examiner* — Kevin P Kerns
*Assistant Examiner* — Kevin E Yoon
(74) *Attorney, Agent, or Firm* — Robert Thompson

(57) ABSTRACT

A method for making parts in conjunction with a mold having a negative shape of the part. The mold is coated with a release agent and thereafter the part material is deposited on the release agent in the mold by gas dynamic cold spray. Thereafter, the release agent is separated from both the mold and the part either thermally, chemically, or mechanically.

6 Claims, 1 Drawing Sheet

MOLD RELEASE METHOD FOR A COLD SPRAY PROCESS

GOVERNMENT INTEREST

The invention described herein may be manufactured, used, and licensed by or for the United States Government.

BACKGROUND

I. Field

The present invention relates generally to molding processes and, more particularly, to a mold release process for use with cold spraying.

II. Description

There are many different types of additive manufacturing processes, such as thermal spray, cold spray, laser forming, casting, and the like in which the manufactured parts are produced using a mold or die. For example, in one known method, molten material is deposited onto or into a mold and, upon cooling, solidifies to form the desired part. The mold must then be removed from the part.

There are many known different ways for separating the part from the mold. For example, in some known methods, the mold with the formed part is immersed in a chemical bath which dissolves the mold but not the part. In other cases, the mold is mechanically machined away from the formed part. In both cases, however, the mold or die is destroyed during the process of separating it from the formed part.

A still further known method of casting parts is known as the "lost wax process." In the lost wax process, the mold is comprised of a low melting material, i.e. the wax that is formed into a negative image of the desired finished part. That wax negative image is then immersed into a ceramic slurry which coats the entire mold surface, except for sprue openings, with the ceramic slurry which is then allowed to dry and harden. That process is repeated until there is a sufficient buildup of hardened ceramic coating surrounding the surface of the wax negative image.

The coated mold is then placed into an oven which heats the mold and the wax to a temperature sufficient to melt the wax which is then removed from the mold leaving the image of the desired part. The part material is then introduced into the mold cavity and, upon cooling, the part is formed.

The process of cold spraying, also known as gas dynamic cold spray, also presents unique problems in molding parts. In a cold spray process, the part material in powder form is directed at high speed against the mold surface. Due to the high velocity of the part material at impact against the mold surface, the part material fuses together and solidifies by a cold forming solid state operation. After sufficient material has been deposited on the mold surface, the mold must be removed in order to obtain the desired manufactured part.

Previously, during the cold spray process, the part material adheres and bonds to the mold surface. Consequently, in order to extract the part from the mold, it has been previously necessary to either mechanically machine away the mold from the finished part, or chemically dissolve the mold. In either case, however, the mold cannot be reused since it is destroyed during the removal process. This, in turn, increases the overall cost of molding parts using the cold spray process.

SUMMARY

The present invention provides a method for making parts using the cold spray process which overcomes the above mentioned disadvantages of the known methods.

In brief, in the method of the present invention, a mold is first formed so that the mold has a negative shape of the desired finished part. The mold may be constructed of any suitable material, such as metal, synthetics, and the like.

The mold surface is then coated with a release agent. Preferably, the release agent comprises a metal which is itself deposited on the mold surface using the cold spray process. This release agent, furthermore, forms a thin layer between the mold surface and the finished part and thus duplicates the shape of the mold surface.

Thereafter, part material is deposited on the release agent on the mold surface by utilizing a cold spray process. The overall temperature of the mold during the cold spray operation is relatively low, typically less than 300° Fahrenheit.

It is important that the release agent be compatible with both the mold as well as the part material. Specifically, the release agent must be compatible with the mold so that the release agent will adhere to the mold to permit the subsequent cold spray process of the part material. Similarly, the release agent must not only adhere to the part material, but must be of sufficient toughness to avoid cracking or other deformations during the cold spray operation of the part material against the release agent.

After a sufficient amount of part material has been deposited on the release agent in the mold, the release agent must be removed from both the mold and the finished part. Different methods may be used to achieve this separation.

First, the release agent may be selected such that it has a lower melting temperature than both the material forming the mold and also the melting temperature of the part material. Consequently, following formation of the part by using the cold spray process, the mold, release agent, and finished part are heated in any appropriate fashion, such as an oven, to a temperature above the melting material of the release agent, but less than the melting temperature of the mold material and part material. Once the release agent melts, the finished part may be easily removed from the mold while retaining the mold intact for subsequent molding operations.

Alternatively, in order to separate the finished part from the mold while retaining the mold intact for subsequent use, a chemical solvent is applied to the part, mold, and the release agent. This solvent is selected so that it dissolves the release agent, but not the mold or the part material. Consequently, upon immersion of the mold, release agent, and finished part into a bath of the solvent, after time the solvent dissolves the release agent thus separating the finished part from the mold.

A still further method to separate the finished part from the mold while retaining the mold intact is to select a release agent that forms only a weak mechanical bond with both the mold as well as the part material. This bond must be sufficient to adhere to both the mold and the part material to allow the formation of the part using the cold spray process, but sufficiently weak so that the release agent may be mechanically separated, e.g. by pressing, the release agent from the finished part and mold following the cold spray operation.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION

Figure 1:
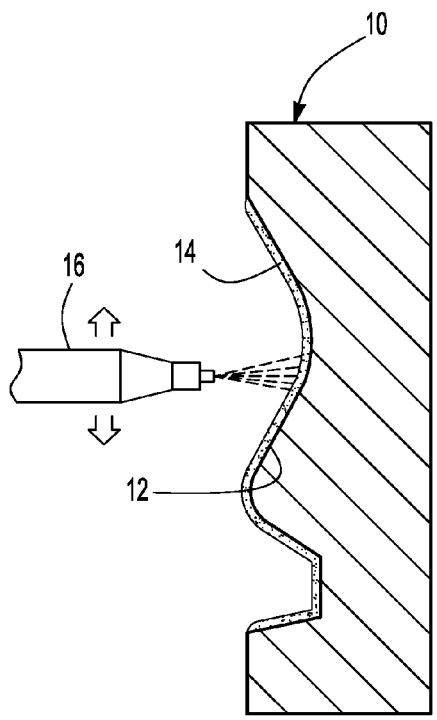
FIG. 1 is a side diagrammatic view illustrating the coating of the mold with the release agent.

With reference first to FIG. 1, a portion of an exemplary mold 10 is shown having a mold surface 12. The mold surface 12 is a negative image of the desired finished part. Furthermore, the mold 10 may be constructed of any suitable material, such as metal, composites, and the like.

Still referring to FIG. 1, a release agent 14 is applied to the mold surface 12 so that the release agent 14 forms a thin coating on the mold surface 12. Since the release agent 14 constitutes only a thin coating, the actual shape of the mold surface 12 is duplicated by the release agent 14.

The release agent 14 is selected so that it is compatible with the mold 10. That compatibility requires that the release agent 14 adhere to the mold 10 during a cold spray operation.

The release agent 14 may be applied to the mold surface 12 of the mold 10 by any conventional method. However, in embodiments of the invention, the coating of the release agent 14 is applied to the mold surface 12 using a cold spray operation illustrated diagrammatically by a cold spray high-speed nozzle 16 in FIG. 1.

Figure 2:
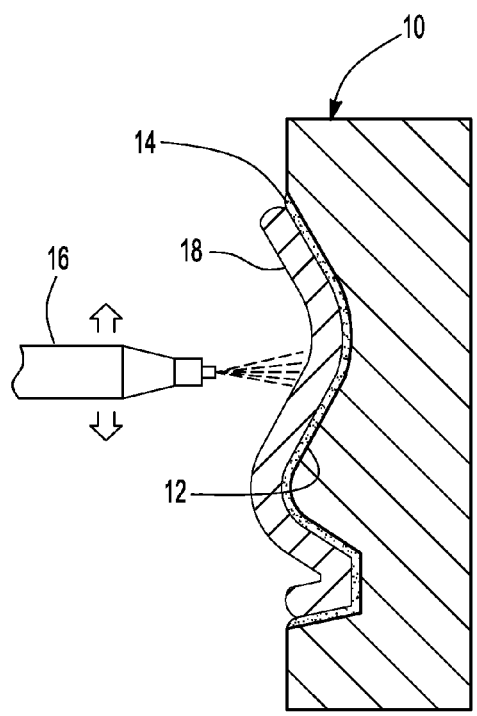
FIG. 2 is a view similar to FIG. 1, but illustrating the mold, release agent, and the finished part on the mold.

With reference now to FIG. 2, in order to form a finished part 18, the part material is deposited over the coating of the release agent 14 by the cold spray process so that the deposited part material 18 also assumes the shape of the mold surface 12. During the cold spray operation, the mold temperature 14 may reach temperatures as high as 300° Fahrenheit due to the high-speed impact of the part material against the mold surface 12 covered with the release agent 14.

It is important that the release agent 14 be compatible with the part material 18. Specifically, the release agent 14 must be of sufficient toughness and durability that it resists cracking or deformation from the part material during the cold spray operation. In addition, the part material must also adhere to the release agent 14.

Following the cold spray process to form the finished part 18, the finished part 18 must be removed from the mold 10 without destruction of the mold 10 during that removal process. This can be achieved in any of several ways.

First, the release agent 14 may be thermally removed from both the part 18 and the mold 10. In order to accomplish this, the material for the release agent 14 is selected such that it has a melting temperature lower than the melting temperature of both the mold 10 and the material of the finished part 18, but sufficiently high to resist deformation or destruction during the cold spray process. For example, assuming that the mold 10 is constructed of a material with a high melting temperature, e.g. steel, and the finished part 18 is made of copper, zinc could be chosen as the material for the release agent 14. Zinc is compatible with the both the mold material and the finished part material, i.e. it will adhere to both, and is also sufficiently tough that it will withstand deformation or cracking during the cold spray process of the copper against the layer of the release agent 14.

Just as importantly, zinc has a relatively low melting temperature of approximately 787° Fahrenheit. Thus, the melting temperature of zinc is much less than steel and less than the melting temperature of copper. However, the melting temperature of approximately 787° Fahrenheit for zinc is still well above the temperatures generated by the cold spray process.

Figure 3:
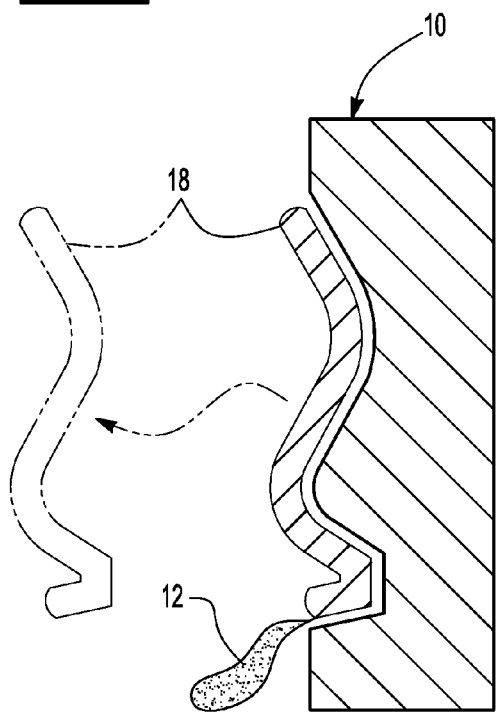
FIG. 3 is a view similar to FIGS. 1 and 2, but illustrating the separation of the finished part from the mold.

After the zinc has been sprayed on the mold 10 to form the release agent layer 14 and copper sprayed onto the release agent layer 14 to form the finished part, the mold, finished part, and release agent are heated to a temperature above the melting temperature of zinc, but less than the melting temperature of both the mold 10 and the finished part 18. Consequently, as shown in FIG. 3, the release agent 14 will melt and flow away from both the mold 10 and finished part 18. After the release agent 14 has been completely melted from between the finished part 18 and the mold 10, the finished part 18 can be easily retrieved. Since the mold remains undamaged during the entire molding operation, the mold 10 may also be reused in subsequent molding operations.

An alternative method of separating the mold 10 from the finished part 18 following the cold spray operation of the finished part material onto the mold 10 is to chemically dissolve the release agent 14 with a solvent. In this method of separating the finished part 18 from the mold 10, the material for the release agent 14 is selected so that it dissolves when immersed in a particular chemical solvent but both the mold 10 and the finished part 18 are unaffected, i.e. do not dissolve, when immersed into the solvent.

For example, assuming that it is desired to produce a tantalum part on a ceramic mold, aluminum could be selected as the release agent. The aluminum is then applied to the mold surface on the ceramic mold using the cold spray process. Tantalum is then sprayed on the aluminum layer of the aluminum release agent on the mold surface.

The resulting mold, release agent 14, and finished part 18 are then immersed in a bath of solvent containing sodium hydroxide. Sodium hydroxide will attack and dissolve the aluminum, but does not dissolve either tantalum or ceramic. Consequently, upon the complete dissolution of the aluminum release agent, the finished part 18 is completely separated from the mold 10 and the mold 10 can be used to manufacture subsequent parts.

A still further method for separating the finished part 18 from the mold 10 is to select the material for the release agent 14 that forms only a weak mechanical bond between the mold 10 and the finished part material during the cold spray process. For example, aluminum can be sprayed against the mold surface 12 to form the release agent 14 and tantalum can be sprayed onto the aluminum release agent 14 to form the finished part. Aluminum, however, forms only a weak mechanical bond with both the mold 10 as well as the finished part 18 so that the finished part 18 may be mechanically removed from the mold 10 without damaging the mold 10. Any conventional mechanism may be used to apply the mechanical force, such as pressing, to separate the finished part 18 from the mold 10.

From the foregoing, it can be seen that the present invention provides a simple yet highly effective method for forming finished parts using the cold spray operation and which avoids destruction of the mold in order to separate the finished part from the mold. Having described our invention, however, many modifications thereto will become apparent to those skilled in the art to which it pertains without deviation from the spirit of the invention as defined by the scope of the appended claims.

We claim:
1. A method for making parts comprising:
   forming a mold having a negative shape of a part;
   coating the mold with a release agent, wherein the release agent has a thickness of from about 0.02 inches and 0.100 inches;
   depositing part material on the release agent in the mold by gas dynamic cold spray wherein the mold is maintained at a temperature of less than or equal to about 300 degrees Fahrenheit, and further wherein said part mate- rial has a measured on the B scale of from about 60 to about 70 HRB and about 40 on the Rockwell C hardness scale; and thereafter separating the release agent from the mold and the part without the need for any machining of the part, wherein said release agent has a lower melting temperature than the part material and wherein said separating step comprises heating the part and the release agent to a temperature greater than the melting point of the release agent but less than the melting point of the part material.

2. The method as defined in claim 1 wherein the melting point of the mold is greater than the melting point of the release agent and wherein said heating further comprises heating said mold to a temperature greater than the melting point of the release agent but less than the melting point of the mold and the part material.

3. The method as defined in claim 1 wherein the melting point of the release agent is greater than 300 degrees Fahrenheit.

4. The method as defined in claim 1 wherein said release agent comprises a metal.

5. The method as defined in claim 4 wherein said release agent comprises zinc.

6. The method as defined in claim 1 wherein said coating comprises depositing the release agent on the mold by gas dynamic cold spray.

\* \* \* \* \*